Figure 1:
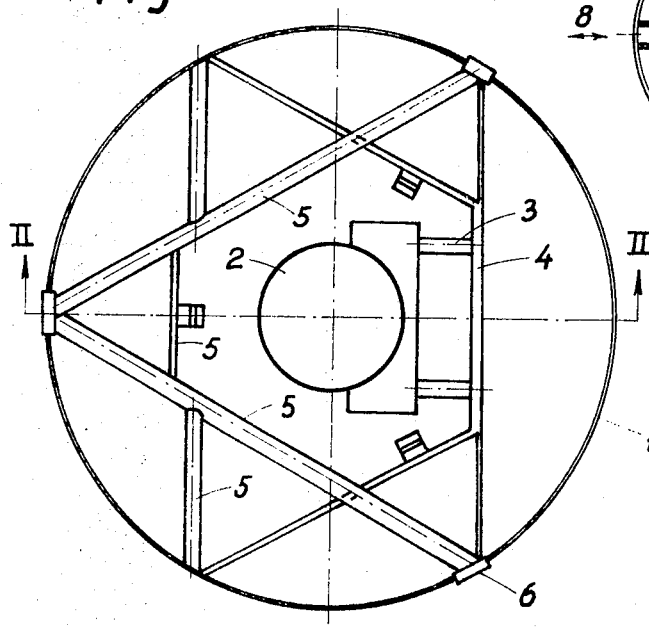

United States Patent

[11] 3,587,669

| [72] | Inventors | Bent Bors Vabo<br>Birkerod;<br>Per Heymann Andersen, Virum, Denmark |
|---|---|---|
| [21] | Appl. No. | 613,506 |
| [22] | Filed | Feb. 2, 1967 |
| [45] | Patented | June 28, 1971 |
| [73] | Assignee | Haldor F. A. Topsoe<br>Frydenlundsvej, Trorod, Vedbaek,<br>Denmark |
| [32] | Priority | Feb. 5, 1966 |
| [33] | | Denmark |
| [31] | | 598/66 |

[54] PROCESS FOR PROVIDING REACTORS WITH CATALYSTS AND VIBRATOR FOR USE IN CARRYING OUT THE PROCESS
4 Claims, 5 Drawing Figs.

[52] U.S. Cl. ............................................. 141/12,
23/288, 141/73, 259/1
[51] Int. Cl. ............................................. B65b 1/22

[50] Field of Search................................................ 23/288,
289, 288.92; 141/72, 71, 74, 78, 79, 73, 12,
(Inquired); 222/161, 196, 216, 236, 239,
(Inquired); 259/11, 20, (Skim Digest), 1, 180,
100, (Mechanical and Ultrasonic Digest), (V.E.
Digest), 72; 209/381; 214/(Inquired)

[56] References Cited
UNITED STATES PATENTS

| 720,053 | 2/1903 | McKibben.................... | 141/77X |
| 1,753,412 | 4/1930 | Harris............................ | 141/77UX |
| 2,337,304 | 12/1943 | Ashton......................... | 141/73UX |
| 2,662,750 | 12/1953 | Degen........................... | 259/V.E. |
| 3,079,050 | 2/1963 | Wahl....................259/Vibrators-Mech. |

FOREIGN PATENTS

| 1,012,856 | 8/1952 | Germany...................... | 259/1 |

Primary Examiner—Morris O. Wolk
Assistant Examiner—D. G. Millman
Attorney—Sol Shappirio ABSTRACT: Method and apparatus for packing catalyst beds utilizing symmetrically spaced vibration generators mounted on an annular vibration-transmitting element which is raised as the catalyst level rises.

PATENTED JUN 28 1971

3,587,669

SHEET 1 OF 2

INVENTORS
BENT BØRS VABØ
PER HEYMANN ANDERSEN

BY *Sol Shappirio*

ATTORNEY

PROCESS FOR PROVIDING REACTORS WITH CATALYSTS AND VIBRATOR FOR USE IN CARRYING OUT THE PROCESS

The invention concerns in the first place a process for filling catalysts into reactors for carrying out gas phase reactions by heterogeneous catalysis, especially for filling ammonia catalyst into an ammonia converter and in the second place a vibrator suitable for use in carrying out the invention.

It is known that the catalyst filling in reactors gradually subside during the working, so that after working for a certain time a catalyst free space will be created at the top of the catalyst bed. As refilling is not practically possible because the reactor normally runs without working stops and consequential loss in production, it would present great advantages if said subsidence could be avoided or reduced. Thus, if by the filling operation the catalyst could be brought to settle so solidly that subsequent subsidence is avoided or reduced, it would be possible to work with a greater amount of catalyst in a given bed during the whole life of the catalyst. An avoidance or reduction of the subsidence would be especially important in such cases where, in working the reactor, the gas flow is caused to pass through the reactor in radial direction, since thereby a more homogenous catalyst filling and consequently an improved gas distribution would be obtainable.

It is furthermore known that a catalyst filling may be vibrated by use of a rod vibrator. It is, however, necessary to vibrate according to a closely predetermined pattern using a very long vibration time per unit of catalyst volume in order to obtain the desired homogeneous filling when using rod vibrators.

It has been found that by this means it is possible to obtain that the filling is satisfyingly homogeneous and that subsidence during working is completely avoided or correspondingly reduced.

It has also been found that by using vibrators of the type commonly used for said work, i.e., rod vibrators, it is possible to obtain the desired result only with difficulty and at great labor cost. By way of example an existing industrial reactor in which the catalyst bed had a diameter of about 1.8 m. and a total height of about 16 m. had to be filled with catalyst in the following way: upon filling in a layer of a catalyst of a height of about 0.3 m. this catalyst layer was vibrated by means of a rod vibrator which was submerged manually in the catalyst bed 320 times in all according to a closely predetermined pattern. This was repeated upon each new filling of 0.3 m. The total filling procedure took 14 days with 10 men at work.

By the process according to the invention this work may, however, be very considerably simplified and the security of obtaining a satisfactory and uniform consolidation is considerably increased.

With this purpose in mind the process according to the invention is characterized in that the catalyst bed is vibrated by using a vibrator consisting of at least one annular vibration-transmitting element placed concentrically in the catalyst.

According to an embodiment of the invention the vibration-transmitting element is subjected to oscillations in the plane of the annular element or ring. Owing to the fact that the oscillations are in the plane of the annular element or ring a good spreading of the vibrations towards the sides and towards the center is obtained so that a rapid and uniform subsidence all over is obtained.

It has been found expedient that according to the invention the annular-vibration transmitting element is subjected to oscillations mainly in a horizontal radial direction in equally spaced points on the ring periphery. In this manner, it has been found that the compression over the whole section will be of the same magnitude, so that the gas flow meets the same resistance at all points, especially in the case of axial flow.

The process according to the invention is expediently carried out in such a manner that the catalyst is supplied layer by layer and that for each filling in it is vibrated by means of an annular-vibration transmitting element working at a suitable height relative to the surface of the catalyst. The vibration-transmitting element is thus brought to work in that section of the catalyst mass where optimal effect of the vibration is obtained, and consequently variations of the specific weight of the mass in vertical direction are hereby avoided.

When carrying out the process in this way the supply of the catalyst may also take place continuously which results in a rapid and secure working. Furthermore, in this embodiment of the process according to the invention the vibration-transmitting element may also be continuously elevated by degrees as the catalyst is filled in, whereby the operation is further speeded up.

The vibrator according to the invention is characterized in that it includes at least one annular ring provided with one or more symmetrically placed vibration generators. If only a single vibration generator is used it must consequently be placed in the center of the ring. Hereby a very simple apparatus, suitable for use in cases where the center of the catalyst bed is free, is obtained.

In a special embodiment according to the invention the vibrator consists of a rigid ring provided with two symmetrically placed vibration generators, preferably magnet vibrators, which are linked together in such a manner that they work in phase. Such a vibrator is suited for use in catalyst beds where the center is occupied by, for instance, a central tube as is the case in catalyst beds in reactors with radial flow.

The vibrator according to the invention may also have three vibration generators, the coupling of which is obtained by connecting each of them to one phase of a three-phase alternating current network, or connecting each of them across a different pair of phases of such network.

The vibrator according to the invention may also instead of having a single annular vibration element, have two or more elements placed concentrically and linked together, whereby it is possible to treat a greater area at one and the same time.

Figure 3:
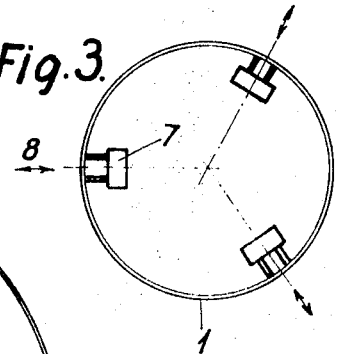
Figure 2:
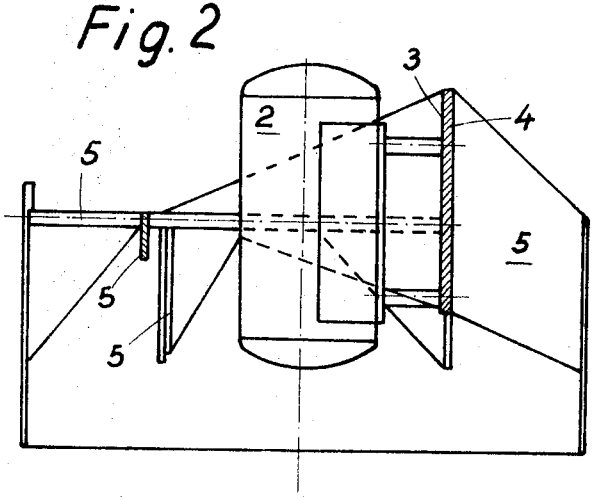
Figure 4:
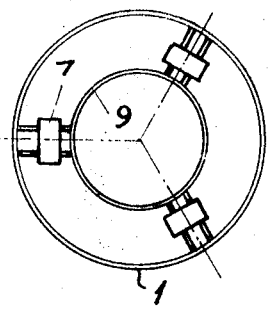
Figure 5:
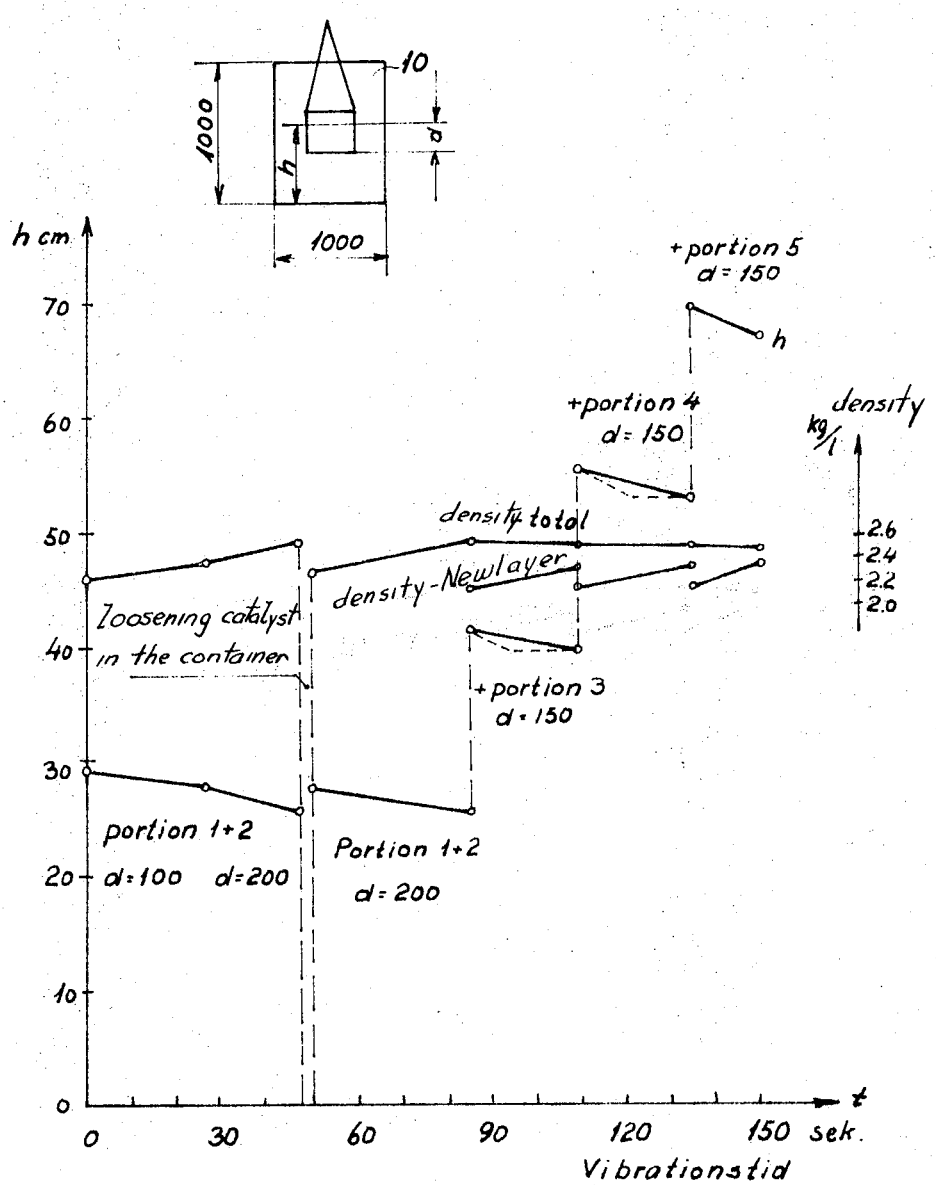

In the following the invention is in greater detail described with reference to the drawing, in which:

FIGS. 1 and 2 in horizontal and in perpendicular central section, respectively, show an embodiment of a vibrator with a single annular vibration-transmitting element and centrally placed vibration generator, FIGS. 3 and 4 more schematically, in horizontal section, vibrators having three symmetrically placed vibration generators and one and two vibration-transmitting elements, respectively, FIG. 5 curves showing the result of experiments carried out on small scale with a vibrator with annular vibration-transmitting element.

In FIGS. 1 and 2, 1 designates an annular vibration-transmitting element, 2 is a vibration generator placed centrally in said element. The latter is mounted, by means of a support 3, on a heavy carrying plate 4 which is connected by stay plates and rods 5 with points 6 disposed symmetrically in the ring 1. As the vibration generator has a side-heavy rotor, the element 1 is mainly subjected to a translatoric movement so that each point of the ring moves in a nearly circular path in the plane of the ring. Said annular element may be freely suspended in the catalyst bed for example by means of steel wires (not shown) during the loading of the reactor.

In the embodiments according to FIGS. 3 and 4 three magnet vibration generators are secured to symmetrical points of the ring 1, the armatures of said generators moving in radial planes as indicated by the arrows 8. In the embodiment according to FIG. 4 there is, apart from the annular element 1, a further concentrically placed annular vibration-transmitting element 9 carried by said annular element 1. The generators 7 may be of the same kind as in the embodiment shown in FIG. 3 and may be secured to the supports between the annular elements 1 and 9.

FIG. 5 shows the result of an experiment carried out in a container as the one indicated by 10 and with the dimensions given therein. The container was supplied with catalyst material in five portions, portion 1 and portion 2 being supplied first, whereupon a vibration was carried out. Then portion 3, portion 4 and portion 5 were supplied. The curves show the subsidence and the specific weight for each treatment, the ordinate, as shown in outline 10, showing the height of the material in the container, the abscissa indicating the vibration time. To the right of the FIG. is given a scale for the density indicated on the drawing. Said values are determined both for a single portion and for the first four portions taken as one and show good agreement indicating that the density does not vary in vertical direction. This is especially important in reactors with radial flow.

We claim:

1. A process for filling and compacting particulate solid into a container, wherein a level bed of particulate solid in said container is vibrated during the filling by means of a vibrator comprising at least one vibration-transmitting annular element placed substantially concentrically within the bed, beneath and adjacent the horizontal surface thereof, the plane of the annular element and the vibrations induced therein being substantially parallel to said horizontal surface, and wherein the said particulate solid is supplied continuously during the filling operation, and the vibrator is elevated gradually as the filling operation proceeds.

2. A vibrator for use in the filling and compaction of particulate solid material into a container comprising at least two concentric vibration-transmitting annular elements provided with at least two symmetrically placed vibration generators.

3. A vibrator for use in the filling and compaction of particulate solid material into a container comprising at least one vibration-transmitting annular element provided with three symmetrically placed magnet vibration generators each of which is connected to one phase of a three-phase alternating current network and wherein the armature of each of said generators moves radially with respect to the annular element.

4. A vibrator according to claim 3 wherein the three symmetrically placed magnet vibration generators are connected across a different pair of phases of a three-phase alternating current network.